United States Patent
Farahati et al.

(10) Patent No.: US 10,132,375 B2
(45) Date of Patent: Nov. 20, 2018

(54) WET FRICTION MATERIALS HAVING FRICTION MODIFIER CARRIER

(71) Applicant: Schaeffler Technologies AG & Co. KG, Herzogenaurach (DE)

(72) Inventors: Rashid Farahati, Copley, OH (US); Murat Bakan, Puebla (MX)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 255 days.

(21) Appl. No.: 15/157,904

(22) Filed: May 18, 2016

(65) Prior Publication Data

US 2017/0335913 A1 Nov. 23, 2017

(51) Int. Cl.
| | |
|---|---|
| *F16D 69/02* | (2006.01) |
| *F16H 45/02* | (2006.01) |
| *F16H 39/42* | (2006.01) |
| *F16D 69/00* | (2006.01) |
| *F16D 13/64* | (2006.01) |

(52) U.S. Cl.
CPC ......... *F16D 69/028* (2013.01); *F16D 69/026* (2013.01); *F16H 39/42* (2013.01); *F16H 45/02* (2013.01); *F16D 13/64* (2013.01); *F16D 2069/001* (2013.01); *F16D 2200/006* (2013.01); *F16D 2200/0034* (2013.01); *F16D 2300/10* (2013.01); *F16H 2045/0289* (2013.01)

(58) Field of Classification Search
CPC .............................. F16D 69/026; F16D 69/028
See application file for complete search history.

(56) References Cited

U.S. PATENT DOCUMENTS

| | | | |
|---|---|---|---|
| 5,064,546 A * | 11/1991 | Dasai ................ | C10M 169/045 508/436 |
| 5,087,642 A | 2/1992 | Seki et al. | |
| 5,384,344 A | 1/1995 | Kamioka et al. | |
| 6,121,168 A | 9/2000 | Irifune et al. | |
| 6,294,505 B1 * | 9/2001 | Luers ..................... | C08K 5/20 106/482 |
| 6,586,373 B2 | 7/2003 | Suzuki et al. | |
| 7,326,742 B2 | 2/2008 | Kawabata et al. | |
| 7,806,975 B2 | 10/2010 | Lam et al. | |
| 8,461,064 B2 * | 6/2013 | Chavdar ............... | F16D 69/026 428/311.11 |

(Continued)

FOREIGN PATENT DOCUMENTS

| | | |
|---|---|---|
| CN | 201010185988 | 11/2011 |
| JP | 2004137305 A | 5/2004 |

(Continued)

OTHER PUBLICATIONS

Celite Technical Data DiaFil 230; dated Dec. 11, 2002; Celite Corporation, Fernley, Nevada; 1 page.
Promaxon D: Improving performance and cost of disc brake pads; dated Jul. 2011; Lapinus Intelligent fibres, Roermond, The Netherlands; 1 page.
Promat Promaxon-D Technical Data Sheet; dated Sep. 16, 2014; Promat; 2 pages.

(Continued)

*Primary Examiner* — Vickey Nerangis
(74) *Attorney, Agent, or Firm* — Adam R. Southworth

(57) ABSTRACT

A friction material for a clutch pad comprising: a plurality of fibers; and, a filler material including at least 0.1% and at most 100% silica rich carrier particles by weight based on total weight of the filler; the silica rich carrier particles having: a median particle size of at least 0.1 μm and at most 50 μm; and, a median pore diameter of at least 0.1 and at most 10 μm.

4 Claims, 4 Drawing Sheets

(56) References Cited

U.S. PATENT DOCUMENTS

| | | |
|---|---|---|
| 8,603,614 B2 | 12/2013 | Lam et al. |
| 8,863,917 B2 | 10/2014 | Subramanian |
| 2004/0175544 A1 | 9/2004 | Saikatsu et al. |
| 2011/0297041 A1* | 12/2011 | Jagar ............... F16D 69/025 106/36 |
| 2012/0108698 A1 | 5/2012 | Lam et al. |
| 2013/0037360 A1 | 2/2013 | Chen et al. |
| 2014/0087982 A1 | 3/2014 | Calcavecchio et al. |

FOREIGN PATENT DOCUMENTS

| | | |
|---|---|---|
| JP | 2007045860 A | 2/2007 |
| WO | 2014203142 A1 | 12/2014 |

OTHER PUBLICATIONS

Celite Micro-Cel C, T-38, CALFLO C Safety Date Sheet #2600; Rev. 13; dated May 5, 2015; Imerys, San Jose, CA; 2 pages.

Celite Micro-Cel T-49 Technical Data; undated; Celite Corporation, Lompoc, California; 1 page.

Promaxon D in friction material applications; undated; Lapinus Intelligent fibres; 6 pages.

CelTiX Technical Data, dated Nov. 17, 2003; Celite Corporation, Lompoc, California, 1 page.

Celite 281 Technical Data, undated; Celite Corporation, Lompoc, California, 1 page.

International Search Report and Opinion for PCT/US2017/026790; 10 pgs; dated Aug. 22, 2017 by Korean Intellectual Property Office.

* cited by examiner

WET FRICTION MATERIALS HAVING FRICTION MODIFIER CARRIER

FIELD

The present disclosure relates generally to a wet friction material for clutch pads, in particular, a wet friction material with a higher friction coefficient.

BACKGROUND

U.S. Pat. No. 6,121,168, hereby incorporated by reference herein, describes a diatomaceous earth in the form of porous, cylindrical particles in wet paper friction material.

BRIEF SUMMARY

Example aspects broadly comprise a friction material for a clutch pad comprising: a plurality of fibers; and, a filler material including at least 0.1% and at most 100% silica rich carrier particles by weight based on total weight of the filler; the silica rich carrier particles having: a median particle size of at least 0.1 µm and at most 50 µm; and, a median pore diameter of at least 0.1 and at most 10 µm. In an example aspect, the silica rich carrier particles further having: a median particle size of at least 1 µm and at most 20 µm; and, a median pore diameter of at least 0.5 and at most 7 µm. In an example aspect, the silica rich carrier particles further having: a median particle size of at least 5 µm and at most 15 µm; and, a median pore diameter of at least 0.5 and at most 5 µm. In an example aspect, the silica rich carrier particles further having: a median particle size of at least 9 µm and at most 11 µm; and, a median pore diameter of at least 1 and at most 3 µm. In an example aspect, the silica rich carrier particles further having: a median particle size of about 10 µm; and, a median pore diameter of about 2 µm. In an example aspect, the silica rich carrier particles are diatomaceous earth. In an example aspect, the diatomaceous earth is selected from the group: Celite® 281, DiaFil® 230, CelTiX™, or any combination thereof. In an example aspect, the silica rich carrier particles have a median pore diameter of at least 10% and at most 40% relative to the median particle size. In an example aspect, the silica rich carrier particles have a median pore diameter of at least 15% and at most 25% relative to the median particle size. In an example aspect, the silica rich carrier particles have a median pore diameter of about 20% relative to the median particle size. In an example aspect, the silica rich silica particles include surface pores arranged for carrying a friction modifier. In an example aspect, the friction modifier is selected from the group: fatty amines, fatty acids, fatty amides, fatty esters, paraffin waxes, oxidized waxes, fatty phosphates, sulfurized fats, long chain alkylamines, long chain alkylphosphites, long chain alkylphosphates, borated long chain polars, or any combination thereof.

Other example aspects broadly comprise a friction material for a clutch pad comprising: a plurality of fibers; and, a filler material including at least 0.1% and at most 100% silica rich carrier particles by weight based on total weight of the filler; the silica rich carrier particles arranged for carrying a friction modifier. In an example aspect, the friction modifier is selected from the group: fatty amines, fatty acids, fatty amides, fatty esters, paraffin waxes, oxidized waxes, fatty phosphates, sulfurized fats, long chain alkylamines, long chain alkylphosphites, long chain alkylphosphates, borated long chain polars, or any combination thereof. In an example aspect, the silica rich carrier particles are characterized as having: a median particle size of at least 0.1 µm and at most 50 µm; and, a median pore diameter of at least 0.1 and at most 10 µm.

Other example aspects broadly comprise a friction material for a clutch pad comprising: a plurality of fibers; and, a filler material including at least 0.1% and at most 100% diatomaceous earth particles by weight based on total weight of the filler; the diatomaceous earth particles having a median pore diameter of at least 1 and at most 3 µm; and the diatomaceous earth particles having a median particle size; wherein the median pore diameter is at least 10% and at most 40% relative to the median particle size; and, wherein the pores include a friction modifier. In an example aspect, the friction modifier is compatible with automatic transmission fluid and is selected from the group: fatty amines, fatty acids, fatty amides, fatty esters, paraffin waxes, oxidized waxes, fatty phosphates, sulfurized fats, long chain alkylamines, long chain alkylphosphites, long chain alkylphosphates, borated long chain polars, or any combination thereof. In an example aspect, the friction material further includes a phenolic resin binder; and, wherein the presence of friction modifier in the pores prevents phenolic resin from entering into the pores. In an example aspect, the diatomaceous earth particles have a median pore diameter of about 20% relative to the median particle size.

Other example aspects broadly comprise a torque converter comprising: a clutch; a plate; and the friction material as in any of the above paragraphs disposed between the clutch and the plate.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

The following description is made with reference to FIGS. 1 through 3C.

Figure 1:
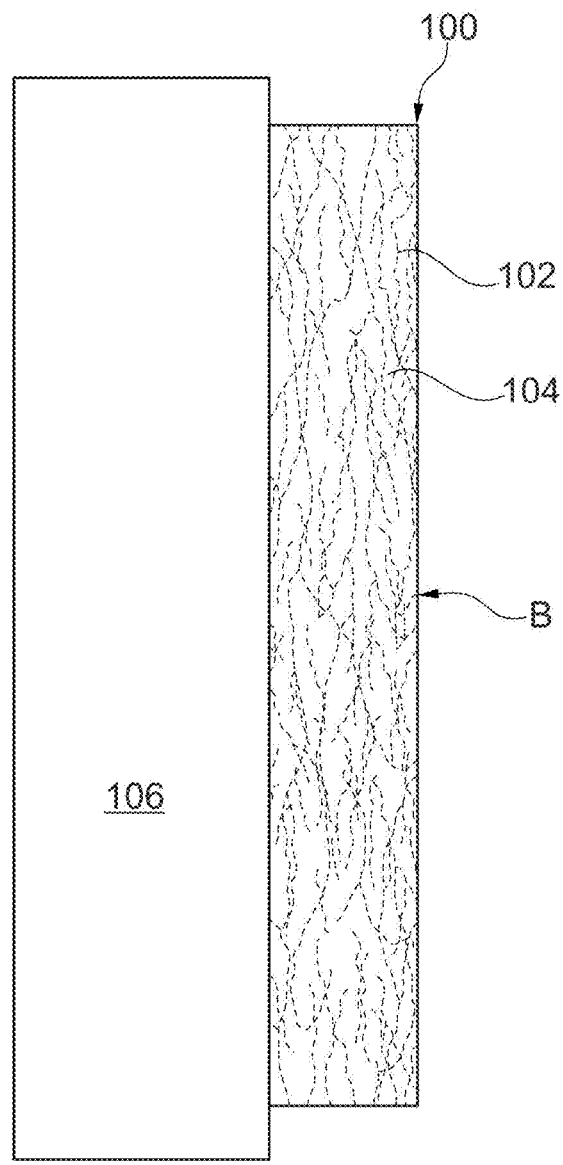
FIG. 1 illustrates a schematic cross-sectional view of a friction material including silica rich carrier filler particles according to an example aspect.

Wet friction materials as known in the art are useful for example for clutches. In an example aspect, a friction material for a clutch comprises a plurality of fibers and a filler material including carrier filler material, or in other words, a plurality of carrier filler particles. FIG. 1 is a schematic cross-sectional view of friction material 100 including fibers 102 and filler material 104 including a plurality particles arranged for carrying a friction modifier. Filler material or filler particles arranged for carrying friction modifier as described herein mean a plurality of carrier filler particles that may be characterized as: (i) capable of having surface interactions with a friction modifier; or (ii) having a particle shape conducive to carrying a friction modifier; or (iii) having a particle size conducive to carrying a friction modifier; or (iv) including pores for carrying a friction modifier; or (v) any combination thereof. A friction modifier herein refers to an additive, component, or ingredient in automatic transmission fluid (ATF) as used, for example, in wet clutches or torque converters. In an example aspect, the carrier is comprised of silica containing particles, also to be referred to interchangeably herein as 'silica rich carrier filler particles' or simply 'silica rich carrier particles'. In an example aspect, the silica containing particles are useful to carry, to be available to, to attract, or to encapsulate a friction modifier. In an example aspect, the silica containing particles are characterized by having a median particle size on the order of about 10 µm. In an example aspect, the silica containing particles are characterized as having pores, which are less than about 10 µm. Without being bound by theory, the pores are effective for carrying the friction modifier.

Friction modifier is an additive, for example, in automatic transmission fluid (ATF). Many friction modifiers as are known in the art for lubrication are suitable, in an example aspect, provided compatibility with the metal clutch, i.e. steel plates, and with the ATF for a clutch or torque converter is maintained. Friction modifiers interact with metal surfaces with polar heads of the friction modifier bonding to the clutch metal surface and repulsive forces from the molecules' tails, for example, aiding in separation of the metal surfaces.

Friction material 100 can be used on any clutch plate 106 known in the art. In an example embodiment, friction material is fixedly secured to plate 106. Friction material 100 includes fiber material 102 and filler material 104 including silica containing carrier filler particles. Friction material 100 further includes binder B, such as a phenolic resin, a latex, a silane, or a mixture thereof. Fiber material 102 can be any organic or inorganic fiber known in the art, for example including but not limited to cellulose fibers, cotton fibers, aramid fibers, carbon fibers, or any combination thereof.

In general, silica containing diatomaceous earth particles may be used, however, silica containing carrier particles other than diatomaceous earth are also useful. Diatomaceous Earth (DE) is a natural silica source formed from the sedimentation of single cell aquatic organisms called diatoms. DE can form in marine or fresh water environments and exhibit properties that are related to their unique shape and structure. These properties will vary according to the diatom species found in each deposit, each with differing chemistries, shape factors, and pore structures. Some examples of silica containing carrier particles include Celite® 281, DiaFil® 230, and CelTiX™. Celite® 281 is a flux-calcined diatomaceous earth of plankton marine diatomite; DiaFil® 230 is a natural diatomaceous earth; and CelTiX™ is a fine, natural freshwater diatomaceous earth product, with excellent reinforcing ability in most types of elastomer. Silica is also referred to as silicon dioxide or $SiO_2$. The diatomaceous earth generally contains about ten percent other oxides besides silica and is substantially devoid of crystalline silica. Typically diatomaceous earth is amorphous.

In an example aspect, the silica rich carrier particles have a median particle size of at least 0.1 µm and at most 50 µm; in other example aspects a median particle size of at least 1 µm and at most 20 µm; in other example aspects a median particle size of at least 5 µm and at most 15 µm; in other example aspects a median particle size of at least 9 µm and at most 11 µm; and, in other examples a median particle size of about 10 µm.

In an example aspect, the silica rich carrier particles have a median pore diameter of at least 0.1 and at most 10 µm; in other example aspects a median pore diameter of at least 0.5 and at most 7 µm; in other example aspects a median pore diameter of at least 0.5 and at most 5 µm; in other example aspects a median pore diameter of at least 1 and at most 3 µm; and, in other example aspects the median particle size is about 2 µm.

Without being bound by theory, it is believed that the silica rich carrier particles provide for improved and increased interaction with friction modifiers compatible with ATF, while also providing for better performance, i.e. providing a positive slope for friction coefficient at high speeds and in a wide range of pressure and temperature levels. Without being bound by theory, it is also believed that the silica rich carrier particles of the aforementioned median particle size and/or having the aforementioned median pore size allow ATF to flow easily through the filler, thus distributing the lubricant evenly for improved performance. Said porosity having attraction to the friction modifier in the ATF results in the added benefit of the friction modifier preventing resin from entering into the pores as binder B is penetrated into the final friction material composite.

Silica containing carrier particles useful in the present invention include, for example, fillers Filler A, B, and C, the properties for which are shown below in Table 1. Example Fillers A, B, and C are amorphous.

TABLE 1

| Property | Unit | Filler A Celite ® 281 | Filler B DiaFil ® 230 | Filler C CelTiX ™ |
| --- | --- | --- | --- | --- |
| Chemical formula | | $SiO_2$ | $SiO_2$ | $SiO_2$ |
| Description | | flux-calcined diatomaceous earth | natural diatomaceous earth | natural diatomaceous earth |
| Median particle size | µm | 9.2 | 11 | 11 |
| Median pore diameter | µm | <3 | 1.8 | 2 |
| Moisture content | wt % | 0.3 | | 3 |

TABLE 1-continued

| Property | Unit | Filler A Celite® 281 | Filler B DiaFil® 230 | Filler C CelTiX™ |
|---|---|---|---|---|
| Oil absorption | wt % | 150 | 120 | 220 |
| BET surface area | m$^2$/g | 2.0 | 33.1 | 26.8 |
| pH | | 10 | 8 | 8 |

Figure 3A:
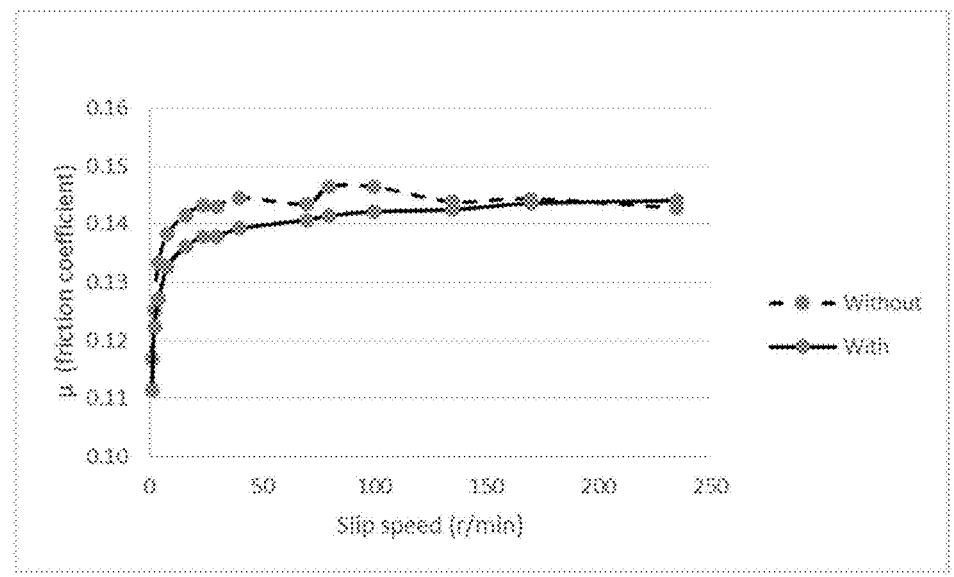
FIG. 3A is a graph plotting respective friction coefficients versus speed for friction material including Filler A including friction modifier and without according to an example aspect.
Figure 3B:
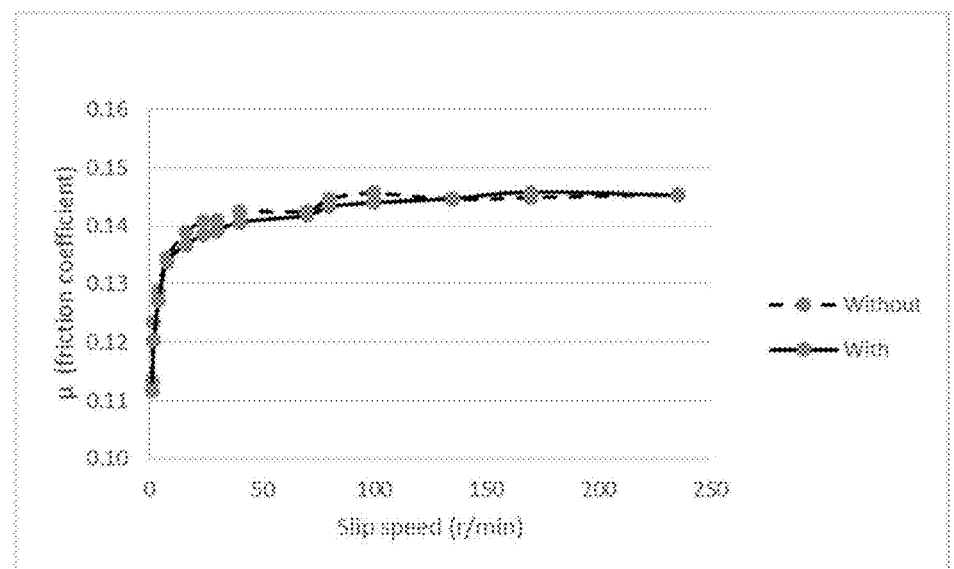
FIG. 3B is a graph plotting respective friction coefficients versus speed for friction material including Filler B including friction modifier and without according to an example aspect; and, FIG. 3C is a graph plotting respective friction coefficients versus speed for friction material including Filler C including friction modifier and without according to an example aspect.
Figure 3C:
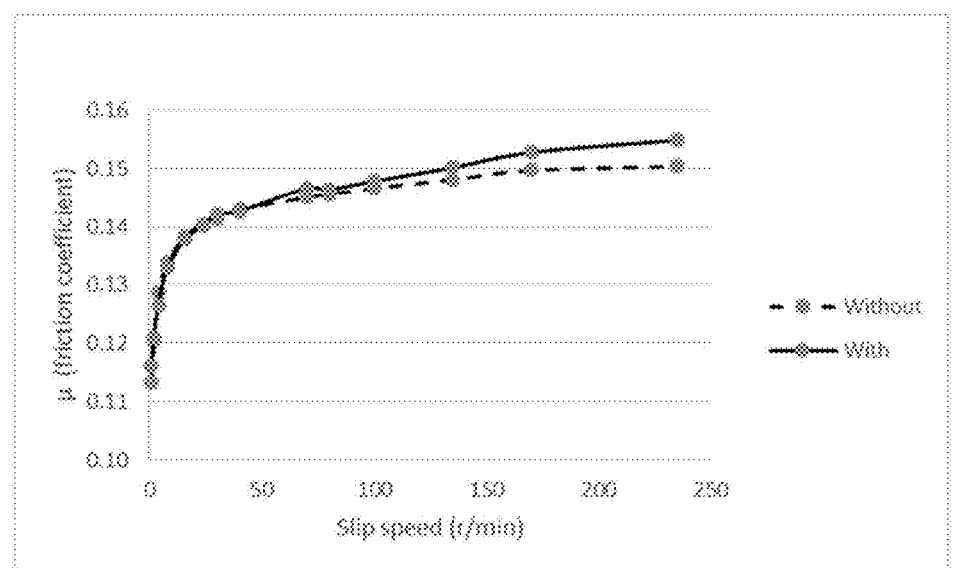

Table 1 indicates that surface area, as measured by the Brunauer-Emmett-Teller (BET) method, may be less of a factor as Filler A has a lower surface area than for Fillers B and C yet significant improvement is shown as in FIGS. 3A through 3C Without being bound by theory, it is believed that silica rich carrier particles having a relatively small median particle size, i.e. less than 50 µm and preferably about 10 µm, and also a median pore diameter of at least 10% of the median particle size contributes to increased interactions with the surface active friction modifier component of the ATF. In other words the diameter of the pores are at least 10% of the median particle size or particle size diameter. In an example aspect, silica rich carrier particles have a median pore diameter of at least 10% and at most 60% of median particle size. In an example aspect, silica rich carrier particles have a median pore diameter of at least 10% and at most 40% of median particle size. In an example aspect, silica rich carrier particles have a median pore diameter of at least 15% and at most 25% of median particle size. In an example aspect, silica rich carrier particles have a median pore diameter of about 20% of median particle size.

Alternatively or in addition to, it is believed that silica rich carrier particles having pores at the surface or outer diameter of the particles, wherein the pores provide a vehicle, if desired, for interacting with, carrying, and/or encapsulating at least one friction modifier compatible with ATF. For wet friction material for clutch applications, any friction modifier as known in the art may be used. Friction modifier(s) typically are included as part of an additive package in an ATF formulation. In an example aspect, friction modifier(s) are present in an amount less than the total amount of the additive package, i.e. about 3 to 20% by volume, for the ATF. In another example aspect, friction modifier(s) are present in an amount less than the total amount of the additive package, i.e. about 6 to 12% by volume, for the ATF.

Typical friction modifiers include fatty amines, fatty acids, fatty amides, fatty esters, paraffin waxes, oxidized waxes, fatty phosphates, sulfurized fats, long chain alkylamines, long chain alkylphosphites, long chain alkylphosphates, borated long chain polars, or others as known in the art. In an example aspect, the friction modifier comprises a generally straight oleophilic tail portion including ten to 24 carbons (10-24 C) as well as an active polar head group portion. In another example aspect, the tail portion includes 18 to 24 carbons (18-24 C). The head portions form layers on the friction surfaces by surface absorption. Friction modifiers must be compatible, meaning do not corrode or cause degradation, with not only the friction material but also the clutch plate, typically made of steel. A non-limiting example of a friction modifier useful in an example aspect is stearic acid. Preferably, at least one friction modifier compatible with ATF is useful in an example aspect.

In an example aspect, the silica rich carrier particles are preloaded with a friction modifier by methods such as using solvents or fusing. This is particularly useful with silica rich carrier particles having a median pore diameter of at least 10% of median particle size and/or surface porosity. In an example aspect, the porous silica rich carrier particles have pore diameters about 20% of the median particle size. Wherein typically ATF is tailored to include an additive package profile to be compatible with regions other than the friction material portions for a clutch or torque converter, for example, alternatively the porous silica rich carrier particles may be preloaded or encapsulated with a friction modifier selected from the group: fatty amines, fatty acids, fatty amides, fatty esters, paraffin waxes, oxidized waxes, fatty phosphates, sulfurized fats, long chain alkylamines, long chain alkylphosphites, long chain alkylphosphates, borated long chain polars, or any combination thereof. In an example aspect, at least one friction modifier compatible with ATF is to be pre-loaded within the surface pores of the porous silica rich carrier particles. In a first example aspect, a friction modifier compatible with ATF is dissolved in acetone to form a solution. Silica rich carrier particles are then stirred in the solution for 24 hours and subsequently the solution is decanted. The silica rich carrier particles are then used as filler material in the paper making process including the fibers as known in the art. Advantageously, the carrier particles having pores filled with friction modifier are distributed randomly in the friction material. During application or use, as the oil flows through these carrier particles, friction modifiers desorb and move to the friction material surface where they provide desired friction characteristics. In a second example aspect, silica rich carrier particles are mixed with molten friction modifiers; therefore, eliminating the need for solvent.

Figure 2:
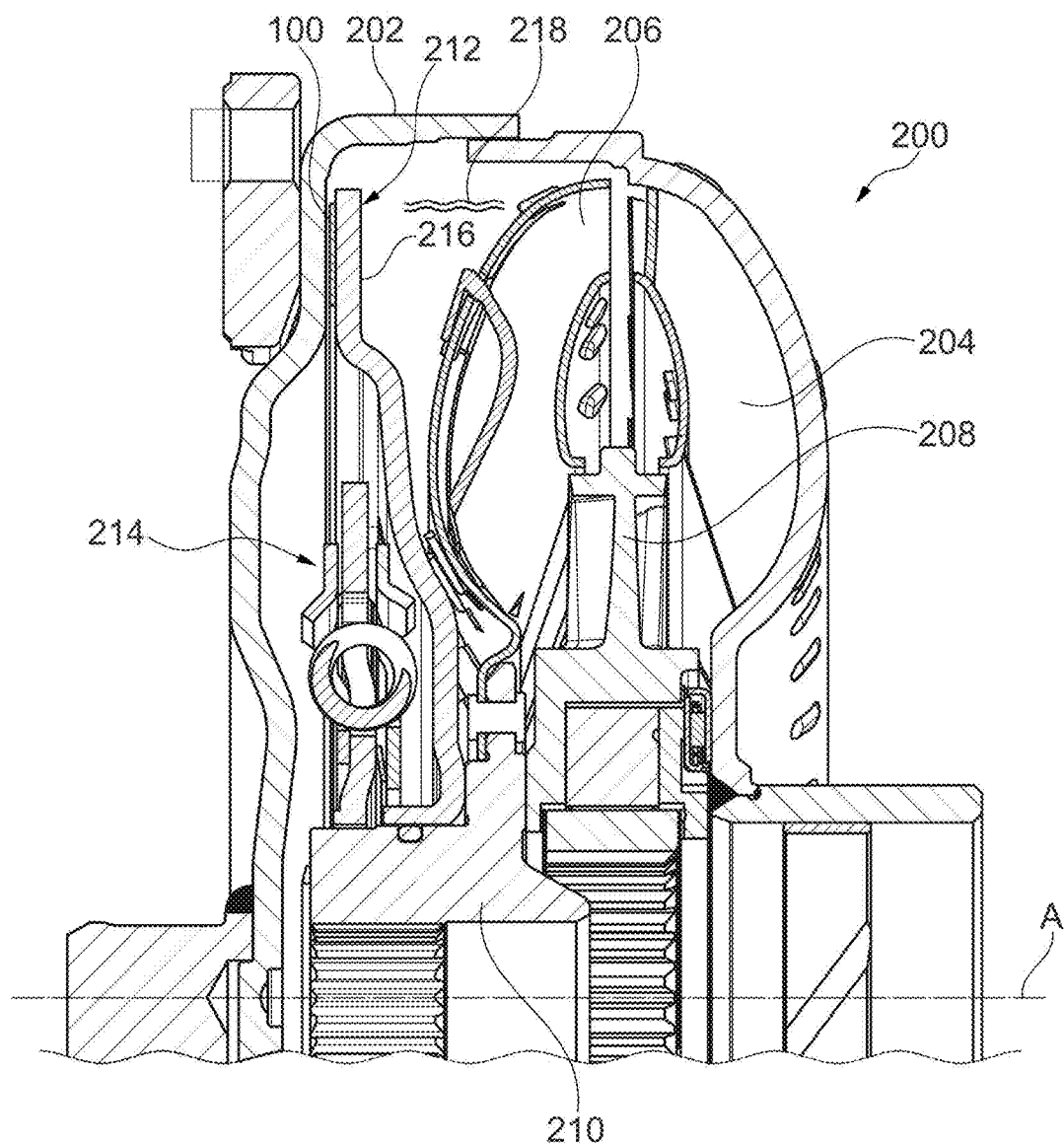
FIG. 2 illustrates a cross-sectional view of a torque converter having friction material according to an example aspect.

FIG. 2 is a partial cross-sectional view of example torque converter 200 including friction material 100 shown in FIG. 1. Torque converter 200 includes cover 202, impeller 204 connected to the cover, turbine 206 in fluid communication with the impeller, stator 208, output hub 210 arranged to non-rotatably connect to an input shaft (not shown) for a transmission, torque converter clutch 212, and vibration damper 214. Clutch 212 includes friction material 100 and piston 216. As is known in the art, piston 216 is displaceable to engage friction material 100 with piston 216 and cover 202 to transmit torque from cover 202 to output hub 210 through friction material 100 and piston 216. Fluid 218 is used to operate clutch 212.

Although a particular example configuration of torque converter 200 is shown in FIG. 2, it should be understood that the use of friction material 100 in a torque converter is not limited to a torque converter as configured in FIG. 2. That is, material 100 is usable in any clutch device, using friction material, for any torque converter configuration known in the art.

Example formulations: Friction material includes 45 percent filler, 55 percent fiber, and a latex binder. Percentages are by weight. Fillers used include Filler A, Filler B, and Filler C; or, Celite® 281, DiaFil® 230, and CelTiX™, respectively. Data plots are for data taken at 2960 kPa surface pressure and 90° C. fluid temperature. Data was collected for the filler materials with and without loading with friction modifier. Stearic acid was used as the friction modifier. It is generally desirable to have a low static friction coefficient and to maximize the dynamic friction coefficient for friction material for a clutch.

FIG. 3A is a graph plotting respective friction coefficients versus speed for friction material 100 as formulated with Filler A with data collected with and without loading with friction modifier. Likewise, FIG. 3B and FIG. 3C are graphs plotting respective friction coefficients versus speed for friction material 100 as formulated with Filler B and Filler C, respectively, and with data collected with and without loading with friction modifier. The speed in the x direction of the graph is the speed of the friction material with respect to a plate with which the friction material is in contact with. For example, the speed is the slip speed between the friction material and the plate.

Static friction coefficients as tested with friction modifier loading are lower for all three filler materials in most temperatures and pressures, which is explainable in that the addition of stearic acid friction modifier provides a better surface protection during the engagement of the clutch thus lowering the static coefficient.

Advantageously, friction material formulated with Fillers A, B, and C as shown in FIGS. 3A through 3C as relates to dynamic friction coefficient, show a more positive slope with friction modifier loading onto the filler material silica rich carrier particles. In other words, the friction coefficient for plots in FIG. 3A-3C continue to increase from slip speed 16 r/min to 235 r/min for example with friction modifier: Filler A increases from 0.136 to 0.144 with friction modifier as compared with from 0.141 to 0.143 without friction modifier; Filler B increases from 0.137 to 0.145 with friction modifier as compared with from 0.139 to 0.146 without friction modifier; Filler C increases from 0.138 to 0.155 with friction modifier as compared with from 0.138 to 0.150 without friction modifier. Variations in behavior of filler materials are believed to be due at least in part to particle morphology.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A friction material for a clutch pad comprising:
    a plurality of fibers;
    a filler material including at least 0.1% and at most 100% diatomaceous earth particles by weight based on total weight of the filler; the diatomaceous earth particles having a median pore diameter of at least 1 and at most 3 μm; and the diatomaceous earth particles having a median particle size; wherein the median pore diameter is at least 10% and at most 40% relative to the median particle size; and, wherein the pores include a friction modifier; and,
    a phenolic resin binder, wherein the presence of the friction modifier in the pores prevents phenolic resin from entering into the pores.

2. The friction material of claim 1, wherein the friction modifier is compatible with automatic transmission fluid and is selected from the group: fatty amines, fatty acids, fatty amides, fatty esters, paraffin waxes, oxidized waxes, fatty phosphates, sulfurized fats, long chain alkylamines, long chain alkylphosphites, long chain alkylphosphates, borated long chain polars, or any combination thereof.

3. The friction material of claim 1, wherein the diatomaceous earth particles have a median pore diameter of about 20% relative to the median particle size.

4. A torque converter comprising:
    a clutch;
    a plate;
    the friction material of claim 2 disposed between the clutch and the plate.

* * * * *